United States Patent
Sundermeyer

(10) Patent No.: US 11,131,607 B2
(45) Date of Patent: Sep. 28, 2021

(54) MODAL ANALYSIS FOR DAMAGE RATE MEASUREMENT AND PREDICTION

(71) Applicant: Caterpillar Inc., Deerfield, IL (US)

(72) Inventor: Jeffry N. Sundermeyer, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 207 days.

(21) Appl. No.: 16/401,766

(22) Filed: May 2, 2019

(65) Prior Publication Data

US 2020/0348211 A1 Nov. 5, 2020

(51) Int. Cl.
*G01M 17/007* (2006.01)

(52) U.S. Cl.
CPC .................... *G01M 17/007* (2013.01)

(58) Field of Classification Search
CPC .......................... G01M 17/007; G01M 5/0033
See application file for complete search history.

(56) References Cited

U.S. PATENT DOCUMENTS

| | | | |
|---|---|---|---|
| 6,448,488 B1 | 9/2002 | Ekhaus et al. | |
| 6,647,161 B1 | 11/2003 | Hodge | |
| 7,260,501 B2 | 8/2007 | Pattipatti et al. | |
| 7,505,844 B2 | 3/2009 | Wiseman et al. | |
| 8,086,640 B2 | 12/2011 | Grichnik et al. | |
| 8,484,790 B2 | 7/2013 | Zhu et al. | |
| 8,667,332 B2 | 3/2014 | Bharadwaj et al. | |
| 9,964,468 B1 | 5/2018 | Wu et al. | |
| 2005/0273277 A1 | 12/2005 | Ridnour et al. | |
| 2010/0100338 A1 | 4/2010 | Vik et al. | |
| 2011/0054840 A1 | 3/2011 | Hively et al. | |
| 2014/0047271 A1 | 2/2014 | Gray et al. | |
| 2014/0058709 A1 | 2/2014 | Machado Viana et al. | |
| 2016/0349151 A1* | 12/2016 | Sundermeyer | G05B 23/024 |

FOREIGN PATENT DOCUMENTS

| | | | |
|---|---|---|---|
| CN | 102081020 A | 6/2011 | |
| EP | 0448890 B1 | 12/1997 | |

OTHER PUBLICATIONS

Kincaid, et al, "D-optimal designs for sensor and actuator locations", Computers & Operations Research 29 (2002), Elsevier Science Ltd. 701-7 13.
Office action for U.S. Appl. No. 14/727,022, dated Feb. 7, 2018, Sundermeyer, "Method for Improving Severity Estimates", 30 pages.
Office action for U.S. Appl. No. 14/727,022, dated Sep. 20, 2018, Sundermeyer, "Method for Improving Severity Estimates", 20 pages.

* cited by examiner

*Primary Examiner* — Manuel A Rivera Vargas
(74) *Attorney, Agent, or Firm* — Lee & Hayes, PLLC

(57) ABSTRACT

Damage rate data associated with a plurality of positions on a machine can be used construct a damage rate covariance matrix, from which a matrix of modes can be derived. A subset of modes from the matrix of modes can be identified, and damage rate monitoring positions on the machine can be selected by identifying a subset of the plurality of positions on the machine that maximize a determinant associated with the matrix of modes using D-optimal row selection.

20 Claims, 8 Drawing Sheets

MODAL ANALYSIS FOR DAMAGE RATE MEASUREMENT AND PREDICTION

TECHNICAL FIELD

The present disclosure relates to composite work cycles and more particularly to a method that uses modal analysis for damage rate measurement and prediction for composite work cycles.

BACKGROUND

Composite work cycles (CWCs) are often used when developing and analyzing large complex structural systems, such as the structure of an excavator, wheel loader, or other machine. A CWC can be a list of simulated and/or test events, along with weightings associated with each event that allow estimates of composite fatigue life to be made at multiple positions on the structure of a machine. Estimates of composite fatigue life may be made based on a targeted percentile of severity in observed customer data, such as the $90^{th}$ percentile. The accuracy of a CWC can be determined based on how closely the estimates made from the CWC match observed data. For example, the accuracy of a CWC can be measured based on the difference between $90^{th}$ percentile damage rates predicted from a CWC and observed 90th percentile damage rates from a statistically-significant sample of observed customer data. Unfortunately, the variability in equipment application and severity in the user base may be high, and poorly understood. Accordingly, a defined composite work cycle may not closely map to desired severity percentiles.

U.S. Patent Application Publication No. 2005/0273277 to Ridnour (hereinafter "Ridnour") describes processes for determining the useful life of machine structures by predicting failures at specific locations on the machine structures. Ridnour describes placing sensors at various locations on the structure of a machine, then using a modal approach with principal component analysis (PCA) to determine which of those sensors provides data that can best predict the fatigue life of the structure of a machine. However, although Ridnour can determines which sensor provided the most useful data after tests have been performed, Ridnour does not use modal analysis to determine where to place the sensors before the tests are performed. Ridnour also only predicts the fatigue life of a particular machine that has been tested, and does not use modal analysis of an old design for a machine to predict damage rates for new designs of the machine.

The example systems and methods described herein are directed toward overcoming the various deficiencies described above.

SUMMARY

According to a first aspect, a method can include obtaining damage rate data associated with a plurality of positions on a machine. The method can also include constructing a damage rate covariance matrix based on the damage rate data and deriving a matrix of modes from the damage rate covariance matrix. The method can further include selecting damage rate monitoring positions on the machine by identifying a subset of the plurality of positions on the machine that maximize a determinant associated with the matrix of modes using D-optimal row selection.

According to a further aspect, a computing system can include one or more processors and memory storing computer-executable instructions that, when executed by the one or more processors, cause the one or more processors to perform operations. The operations can include obtaining damage rate data associated with a plurality of positions on a machine. The operations can also include constructing a damage rate covariance matrix based on the damage rate data, and deriving a matrix of modes from the damage rate covariance matrix. The operations can further include selecting damage rate monitoring positions on the machine by identifying a subset of the plurality of positions on the machine that maximize a determinant associated with the matrix of modes using D-optimal row selection.

According to another aspect, a method of predicting damage rates for a new machine design can include obtaining damage rate data associated with an old machine design based on a first simulation, constructing a damage rate covariance matrix based on the damage rate data, and deriving a matrix of modes from the damage rate covariance matrix. The method can also include selecting damage rate monitoring positions on the old machine design based on maximizing a determinant associated with the matrix of modes using D-optimal row selection, and measuring damage rates at the damage rate monitoring positions on a sample of machines corresponding to the old machine design. The method can further include selecting target observed damage rates from the damage rates, and estimating modal coordinates that reproduce the target observed damage rates from the damage rates. The method can also include obtaining new damage rate data associated with a new machine design based on a second simulation, and constructing a new damage rate covariance matrix based on the new damage rate data. The method can include translating the modal coordinates associated with the target observed damage rates for the old machine design into a new distribution associated with the new damage rate covariance matrix for the new machine design, and predicting damage rates for the new machine design that correspond to the target observed damage rates based on a relative position of the modal coordinates in the new distribution.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 6 also depicts component values for the modes at candidate positions on a machine.

In FIG. 8, a position for a $90^{th}$ percentile of observed damage rates for an old design of the machine, as well as a predicted position for $90^{th}$ percentile damage rates for a new design of the machine, are shown.

DETAILED DESCRIPTION

Figure 1:
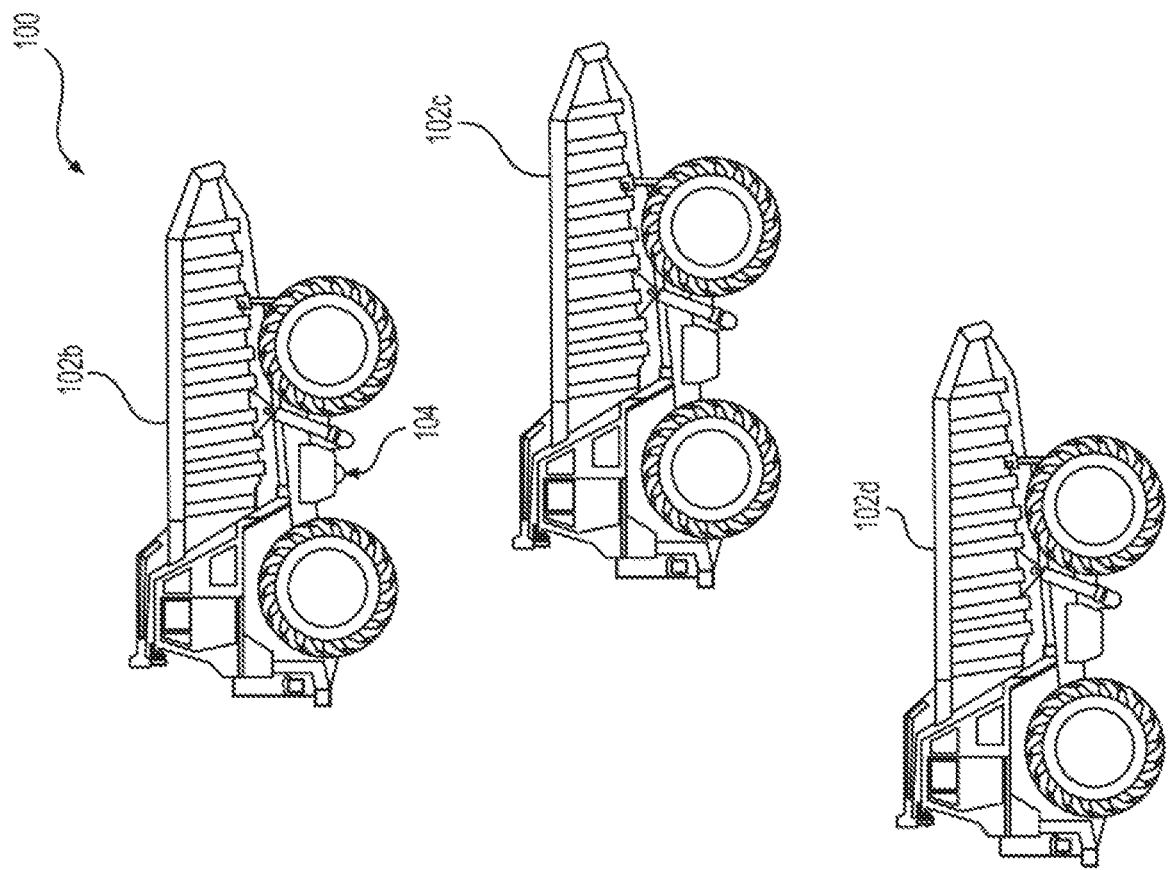
FIG. 1 depicts an example of a worksite where a plurality of machines has been deployed.
Figure 1:
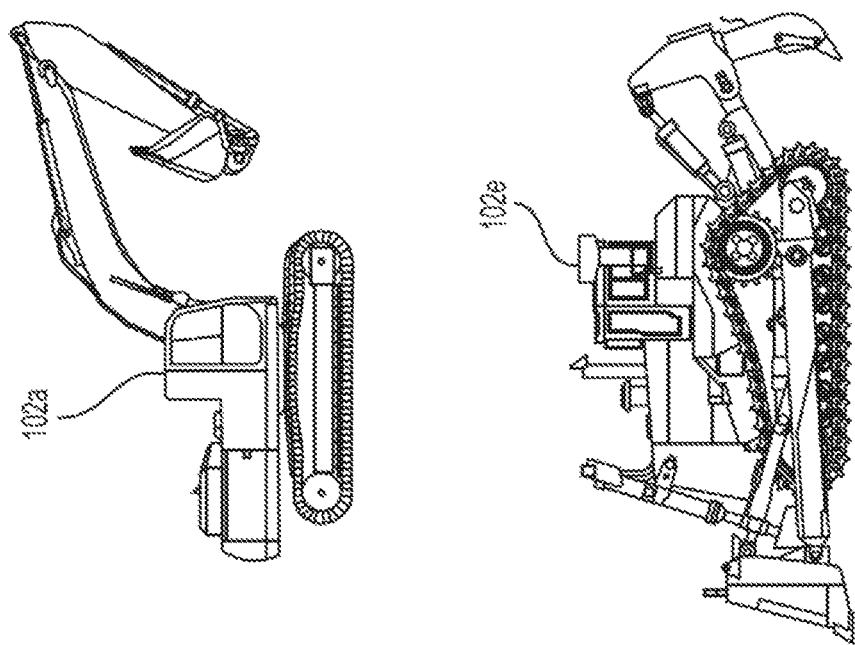

FIG. 1 depicts an example of a worksite 100 where a plurality of machines 102 have been deployed. As shown in FIG. 1, a worksite 100 may include one or more machines 102a-102e, hereinafter also collectively referred as "machine 102" or "machines 102." In some examples, a worksite 100 can be a mine site, a construction site, a power plant, or any other type of worksite or work environment where one or more machines 102 and/or or other equipment can be deployed to perform one or more work tasks. In other examples, a worksite 100 can be a testing environment where machines 102 can be tested as described herein.

A machine 102, as the term is used herein, may refer to a fixed or mobile machine that performs one or more types of operations associated with one or more industries, such as mining, construction, paving, farming, or other industries, and may operate between or within worksites 100 and other environments. A non-limiting example of a fixed machine 102 can include an engine system operating in an off-shore plant environment, such as an off-shore drilling platform. Non-limiting examples of mobile machines 102 include commercial machines, such as trucks (e.g., mining trucks, haul trucks, on-highway trucks, off-highway trucks, articulated trucks, etc.), cranes, draglines, pipe layers, earth moving vehicles, mining vehicles, backhoes, loaders (e.g., large wheel loaders, track-type loaders, etc.), shovels, material handling equipment, farming equipment, marine vessels, aircraft, and any type of movable machine that operates in a work environment. Such machines 102 deployed on a worksite 100 may be manned machines, autonomous machines, or semi-autonomous machines. In examples in which the machines 102 are autonomous or semi-autonomous, the speed, steering, work tool positioning/movement, and/or other functions of the machines 102 may be controlled automatically or semi-automatically by on-board or off-board controllers or computing devices, such as computing devices with processors executing computer-readable instructions configured to control the machine autonomously or semi-autonomously.

Strain measurement devices 104 can be deployed on a machine 102. Strain measurement devices 104 can include wireless fatigue nodes, wired fatigue nodes, strain gauges, rosettes, or other such devices that are configured to measure strain on machines 102 or machine components. The strain measurement devices 104 can calculate accumulated damage at user-specified planes in the strain measurement device 104. In some examples, the strain measurement devices 104 can be programmed with an S-N curve, and/or can be configured to sample strains at various frequencies. In one embodiment, strain measurement devices 104 can be programmed to sample strains up to 512 Hz, however in other embodiments the strain measurement devices 104 can be programmed to sample strains at other frequencies up to any other desired maximum.

Strain data from strain measurement devices 104 can be received by one or more of the modules discussed below, such as an electronic control module 112. For example, during testing, a set of strain measurement devices 104 can be installed on one or more machines 102. In some examples, each machine 102 being tested can be substantially identically instrumented, and each machine 102 can have the same number of strain measurement devices 104. As noted above, in some examples a strain measurement device 104 can be a wireless fatigue node. However, although "wireless fatigue nodes" are used herein as an example, any instrumentation that is mapped to damage accumulation may be used instead.

Strain data from strain measurement devices 104 and/or other test data can be used as described below such that estimates of composite fatigue life can be made at multiple positions on the machine 102. In some examples, although a single strain measurement device 104 may measure strain data associated with a particular position on the structure of a machine 102, as will be discussed below, positions for a set of strain measurement devices 104 can be selected on a machine 102 such that strain data measured at a relatively small number of positions on the machine 102 can be used to infer strain data and/or fatigue life associated with a higher number of positions on the machine 102.

In some examples, physical tests of a machine 102 or computer simulations of such tests can proceed according to a CWC. A CWC can include a list of events, as well as coefficient weightings associated with each event. In some examples, CWCs can be defined as a selected set of defined test events intended to map to a desired percentile in a severity response distribution, such as a $90^{th}$ percentile in observed customer damage rate information. While the $90^{th}$ percentile may be used in various examples described herein, in other embodiments, percentiles greater than the $90^{th}$ percentile (e.g., the $95^{th}$ percentile) or less than the $90^{th}$ percentile (e.g., the $85^{th}$ percentile) may also be used when mapping severity response distributions.

Figure 2:
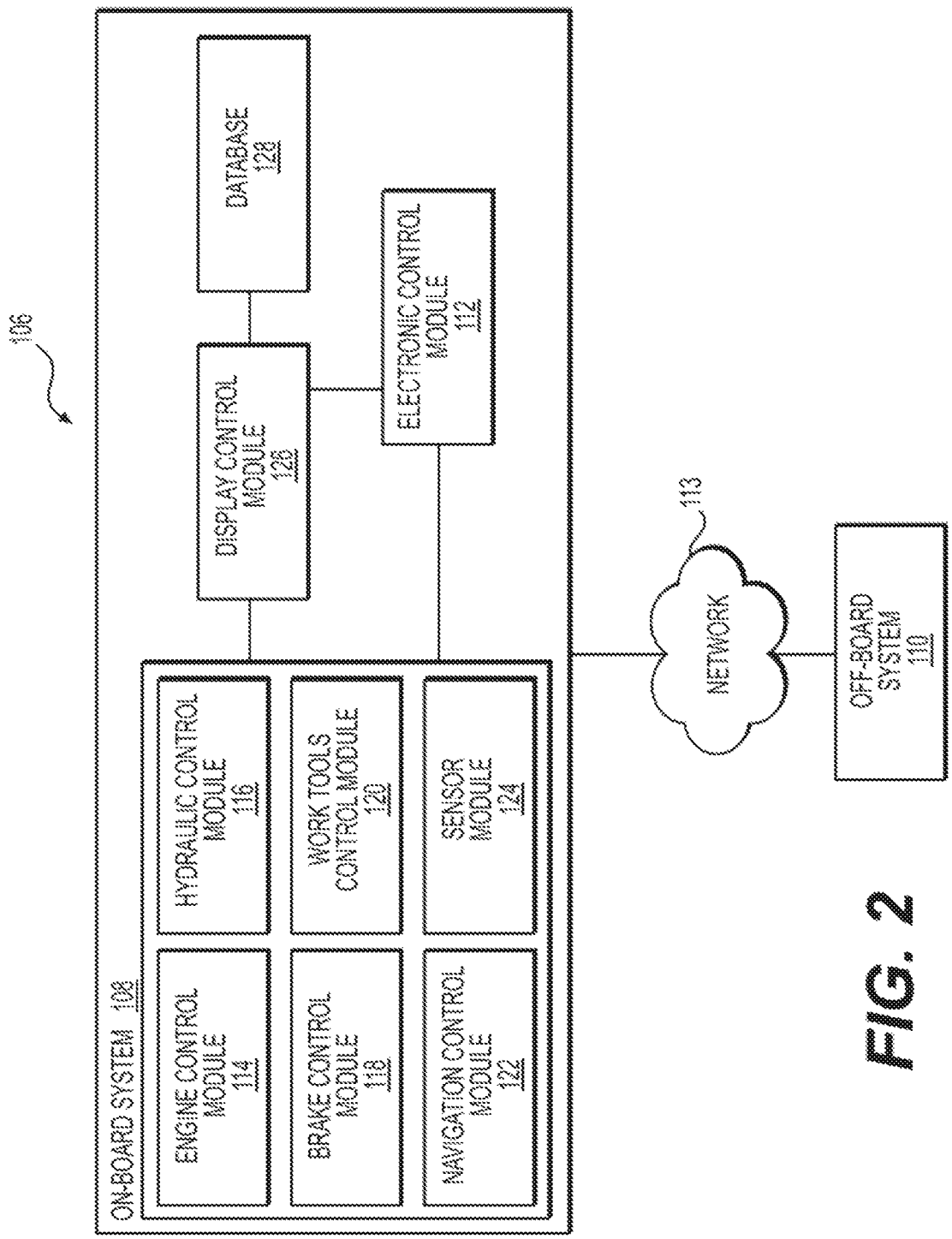
FIG. 2 illustrates a block diagram of a system that may be configured to perform functions within an environment, such as a worksite.

A machine 102 can include on-board communications, monitoring systems, and/or controls. FIG. 2 illustrates a block diagram of a system 106 that may be configured to perform functions within an environment, such as the worksite 100 described in FIG. 1. In some embodiments, the system 106 can include an on-board system 108 and an off-board system 110. In some examples, an on-board system 108 can include an operator display device, as well as any type of power system control module or attachment interface that connects one or more sub-components. A machine 102 can use an on-board system 108 to facilitate operations of the machine 102 during run time and/or non-run time conditions, such as when an engine of the machine 102 is running or not running, respectively. For example, an on-board system 108 can include various modules for capturing and analyzing machine data, such as an electronic control module 112, an engine control module 114, a hydraulic control module 116, a brake control module 118, a work tools control module 120, a Global Positioning System (GPS)/navigation control module 122, a sensor module 124, a display module 126, and/or any other type of module. Referring back to FIG. 1, a machine 102 may also include one or more strain measurement devices 104 from which strain data may be received by one or more of modules of the on-board system 108, such as the electronic control module 112.

It is to be appreciated that an on-board system 108, as the term is used herein, may represent any type of component operating in a machine 102 that controls, or is controlled by, other components or sub-components. In some examples, an on-board system 108 can be embodied as a remote-control station capable of receiving data from one or more control module, such as an engine control module 114, on-board one or more machines 102. In some examples, an on-board system 108 can be configured to control one or more operations of the machine 102 based on the monitoring of data including sensor data, accelerometer data, hydraulic pressure data, and/or any other type of data. In some examples, one or more modules of an on-board system 108 can communicate with other on-board modules to perform various functions related to the operation of a machine 102. For example, a display module 126 can receive data from an engine control module 114 via a data link, such as a J1939 data link, while the engine control module 114 supplies estimated torque and fuel information to a hydraulic control module 116 via other data links. In some embodiments, non-control modules may process the data on-board the machine 102, or data may be processed near-on-board or off-board.

After strain data has been collected, it can be transferred to an off-board system 110. For example, a machine 102 or any control component thereof can also be connected to an associated off-board system 110. An off-board system 110, as the term is used herein, may represent a system that is located remote from a machine 102. Off-board system 110 may be a centralized server, a remote data management system, or other off-board computing system, such as a workstation, personal digital assistant, laptop, mainframe, or other computing device. The off-board system 110 can include one or more computing systems each executing one or more software applications. The off-board system 110 may be implemented in a worksite 100, in a vicinity proximate to one or more worksites 100, in a laboratory, office, or other remote location that is not proximate to a worksite 100, and/or at any other location.

An off-board system 110 can include various hardware devices and modules for monitoring, capturing, and/or analyzing machine data, including strain data, related to one or more machines 102 operating on a worksite 100. For instance, to perform various monitoring and/or control functions, an off-board system 110 may include computing components, such as one or more processors, memory, analysis modules and software, display devices, and/or interface devices that operate collectively to perform one or more processes. In some examples, an off-board system 110 can include one or more controllers, such as Programmable Logic Controllers (PLCs) that can be used in plants and/or factories. Alternatively, or additionally, an off-board system 110 can include one or more communications devices that facilitate the transmission of data to and from an on-board system 108. In various examples, an off-board system 110 can also be associated with a user, such as a customer, (e.g., customer), multiple users, a business entity (e.g., dealer, manufacturer, vendor, etc.), a department of a business entity (e.g., service center, operations support center, logistics center, etc.), and/or any other type of entity that sends and/or receives information to and/or from an on-board system 108. Further, in some examples, an off-board system 110 can execute off-board software applications that download or upload information to and/or from an on-board system 108 via a network 113 or other type of data connection.

Processor(s) of an on-board system 108 and/or off-board system 110 may operate to perform a variety of functions, as set forth herein. In some examples, the processor(s) may include a central processing unit (CPU), a graphics processing unit (GPU), both CPU and GPU, or other processing units or components known in the art. System memory of the on-board system 108 and/or off-board system 110 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media may be non-transitory computer-readable media. The computer-readable media may be configured to store computer-executable instructions that can be executed by the processor(s) to perform the operations described herein. Additionally, the processor(s) may possess local memory, which also may store program modules, program data, and/or one or more operating systems.

Example embodiments may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Figure 3:
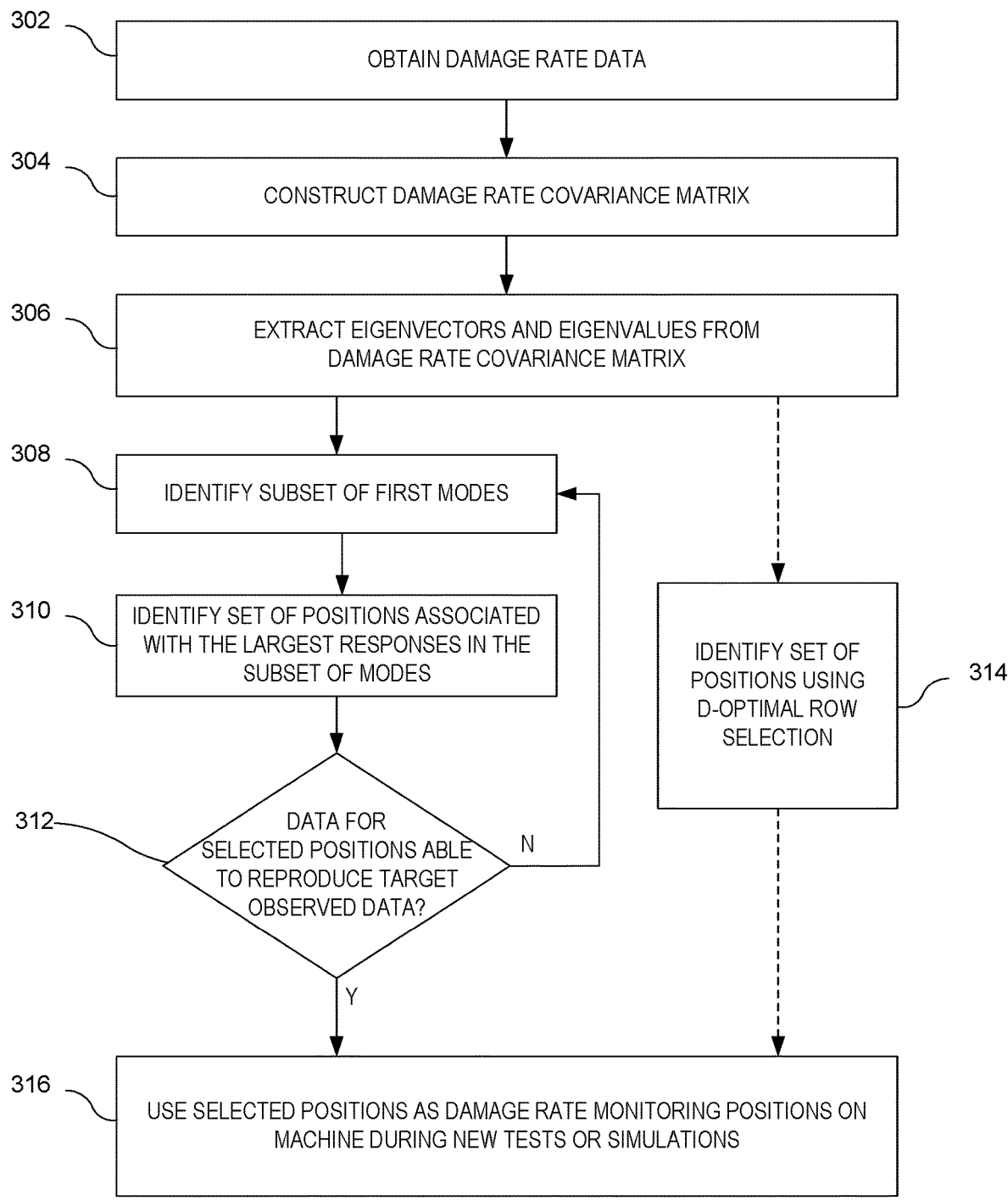
FIG. 3 is a flowchart illustrating a method for selecting damage rate monitoring positions on a machine to improve CWCs.

FIG. 3 is a flowchart illustrating a method 300 for selecting damage rate monitoring positions on a machine 102 to improve CWCs. Method 300 is described for illustration purposes only with respect to the worksite environment and machine components and processes depicted in FIGS. 1-2. However, it should be apparent that method 300 may be employed with other systems and interfaces. Further, the order of operations of FIG. 3 should not be considered limiting. The method of FIG. 3 can be performed by one or more off-board systems 110 or other computing devices. In some examples, computer-readable instructions can be executed by one or more processors of the off-board systems 110 or other computing devices to implement the operations of method 300.

Method 300 may begin at operation 302, where an off-board system 110 can obtain damage rate data for a CWC event. Damage rate data, including strain and/or fatigue damage values, can be obtained during tests or simulations in which one or more machines 102 are subjected to fatigue-damaging events. In some examples, damage rate data can be obtained or derived from strain measurement devices 104 placed at multiple positions on one or more machines 102 that measure strain data during physical tests. These positions may differ from the damage rate monitoring positions determined later in FIG. 3. Damage rate data from strain measurement devices 104 can be provided to the off-board system 110 for analysis as described herein. In other examples, damage rate data associated with positions on a machine 102 can be obtained from computer simulations that subject a computer representation of a machine 102 to simulated fatigue-damaging events. In some examples, the off-board system 110 can perform the simulations and thus directly generate damage rate data from the simulations. In other examples, one off-board system 110 can perform the simulations and transfer generated damage rate data to another off-board system 110 for analysis.

Damage rates at different positions on a machine 102 can change over time as the machine 102 is being monitored during a test or simulation for a CWC event and damage accumulates at the various positions. For example, in embodiments in which the machine 102 is a wheel loader, and the test or simulation involves repeatedly using the wheel loader to load a haul truck, each time the wheel loader loads the haul truck during the test or simulation, new damage rate data can be obtained for multiple positions on the wheel loader. In some examples, measured loads can be passed through finite element models that yield strain and/or fatigue data during a test event, and the damage rates at multiple positions on the machine 102 can change over time. The reciprocal of a damage rate can express a fatigue life associated with a machine 102.

Figure 4:
FIG. 4 depicts a table of damage rates obtained during tests or simulations at multiple positions on a machine.

In some examples, damage rates DR obtained during operation 302 that correspond to multiple positions on the structure of a machine 102 over time, and/or during multiple repetitions for a CWC event during tests or simulations, can be expressed in table, such as table 400 shown in FIG. 4. For example, data in table 400 can be drawn from simulation data and/or reports from wireless fatigue nodes or other strain measurement devices 104 placed on a machine 102 during physical testing, with each row representing a test or simulation event and each column representing different positions on the machine 102. In some examples, events can be repeated during the test and/or simulation, such that rows can include data from unique and/or repeated events. As shown in FIG. 4, sample means of the damage rates $\overline{DR}$ and standard deviations for the damage rates $S_{DR}$ can also be calculated for each tested or simulated position.

Returning to FIG. 3, at operation 304 the off-board system 110 can construct a damage rate covariance matrix based on the damage rate data for a CWC event. More particularly, the damage rate covariance matrix can be constructed as a square, symmetric, positive semi-definite matrix, where each element is defined by:

$$COV(DR)=[\rho_{ij}S_iS_j].$$

Here, $\rho_{ij}$ is a correlation coefficient between damage rates at $i^{th}$ and $j^{th}$ position, for example between damages rates in the $i^{th}$ and $j^{th}$ columns of the table 400 shown in FIG. 4. $S_i$ is a standard deviation of the damage rate at the $i^{th}$ position, and $S_j$ is a standard deviation of the damage rate at the $j^{th}$ position.

At operation 306, the off-board system 110 can extract eigenvalues and eigenvectors from the damage rate covariance matrix. Although fatigue damage on structural systems, such as machines 102, can be expressed via damage rates as discussed above, fatigue damage can also be expressed as modal quantities. For example, the off-board system 110 can transform fatigue damage rates into a space of fatigue damage mode shapes. In particular, an off-board system 110 can perform a principal component analysis (PCA) based on eigenvector-eigenvalue decomposition to view fatigue damage information as modal quantities. Modes can be eigenvectors of the damage rate covariance matrix for a CWC event, while eigenvalues can be variances of corresponding modal coordinates. Accordingly, an off-board system 110 can use an eigen-decomposition to rotate multi-dimensional coordinates in a damage rate space into a PCA modal "z-space" where all modal variables are uncorrelated. Variables z in the PCA space can also be referred to as principal components or modal coordinates z.

For example, the damage rate covariance matrix constructed during operation 304 can also be expressed using the following equation:

$$COV(DR)=[\rho_{ij}S_iS_j]=CD_zC^T.$$

Here, C is an orthonormal matrix of eigenvectors of the damage rate covariance matrix, while $C^T$ is the transpose of matrix C. More particularly, C can be a matrix in which each column is a normalized eigenvector, and the columns are associated with mode shapes that are orthogonal to each other in a multi-dimensional space. As will be discussed further below, $D_z$ can be a diagonal matrix of eigenvalues $\lambda$ of the damage rate covariance matrix.

Accordingly, because C is an orthonormal matrix, it can represent a rotation of coordinates in a damage rate space into modal coordinates z in the modal z-space. In other words, off-board system 110 can rotate damage rate values, such as values in table 400, into modal coordinates z in the modal z-space where the modal coordinates z are uncorrelated. For example, for a column vector of damage rates {DR}, an off-board system 110 can find corresponding modal coordinates z using the following equation:

$$z=C^T\{DR\}.$$

Similarly, given matrix C and a modal coordinate z, an off-board system 110 can find a column of corresponding physical damage rate values using the following equation:

$$Cz=\{DR\}.$$

Based on the equations above, an off-board system 110 can express any given column of damage rates as a linear superposition of damage rate modes (the eigenvectors of matrix C) and modal coordinates z. For example, an off-board system 110 can express a column of damage rates as a matrix multiplication of matrix C and a modal coordinate z. An off-board system 110 can similarly calculate an average damage rate column vector using average values of modal coordinates z. Accordingly, an off-board system 110 can go back or forth between a damage rate space and a modal space during an analysis using C, the matrix of eigenvectors. Overall, the off-board system 110 can use the modal approach described herein to span the damage rate space using the eigenvectors in matrix C.

As noted above, $D_z$ can be a diagonal matrix of eigenvalues $\lambda$ of the damage rate covariance matrix. The eigenvalues $\lambda_i$ along the diagonal of matrix $D_z$ can be variances of corresponding modal coordinates $z_i$, as shown below:

$$D_z = \begin{bmatrix} \lambda_1 & & & & \\ & \lambda_2 & & & \\ & & \lambda_3 & & \\ & & & \ddots & \\ & & & & \lambda_N \end{bmatrix} \quad \lambda_i = Var(z_i).$$

In some examples, eigenvalues in the diagonal matrix $D_z$ can be ordered from the highest eigenvalue to the lowest eigenvalue.

Figure 5:
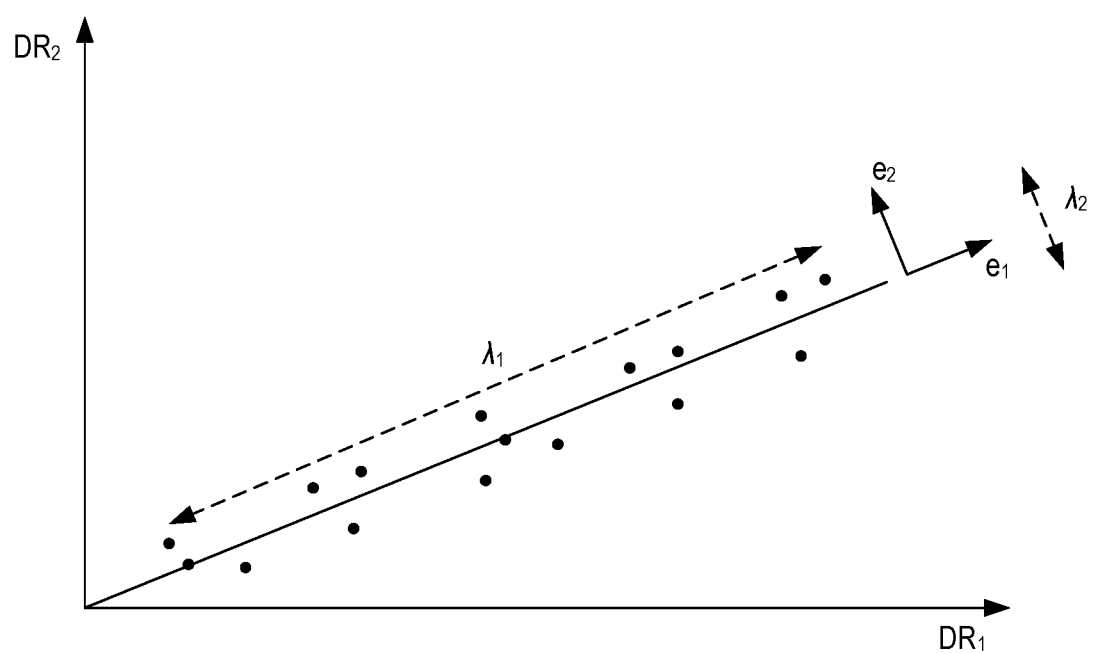
FIG. 5 depicts a two-dimensional plot of eigenvectors and eigenvalues for damage rates corresponding to two positions on a machine.

As a non-limiting example, FIG. 5 depicts a two-dimensional plot of eigenvectors and eigenvalues for damage rates corresponding to two positions on a machine 102. In FIG. 5, the dots can represent damage rates in the damage rate space as a combination of damage rates $DR_1$ and $DR_2$ at the two positions. However, as shown in FIG. 5 the damage rates can also be expressed in the modal space using modal coordinates z using the equation $$\begin{Bmatrix} DR_1 \\ DR_2 \end{Bmatrix} = z_1 e_1 + z_2 e_2,$$

where $e_1$ and $e_2$ are orthogonal eigenvectors from matrix C and the eigenvalues can be expressed as $\lambda_1 = \text{Var}(z_1)$ and $\lambda_2 = \text{Var}(z_2)$. In FIG. 5, the first eigenvector $e_1$ can be aligned along a principal axis of correlation, while the second eigenvector $e_2$ can be orthogonal to the first eigenvector. The eigenvalues can express a measure of scatter of the damage rates along the eigen-axes.

As noted above, the eigenvectors of matrix C can express orthogonal modes, and the eigenvalues $\lambda_i$ along the diagonal of matrix $D_z$ can be variances of corresponding modal coordinates $z_i$, ordered from the highest to the lowest. Accordingly, the modes of matrix C can also be arranged in order, such as in an order based on the variances of the corresponding modal coordinates $z_i$. Overall, the modes associated with higher eigenvalues $\lambda$ can govern shorter fatigue lives of the machine 102, while modes associated with lower eigenvalues $\lambda$ can govern longer fatigue lives of the machine 102. As such, because many types of analyses focus on determining or predicting shorter fatigue lives for machines 102, in many examples a subset of the first few modes in matrix C that are associated with higher eigenvalues $\lambda$ can be used in some embodiments when evaluating a machine 102.

Figure 6:
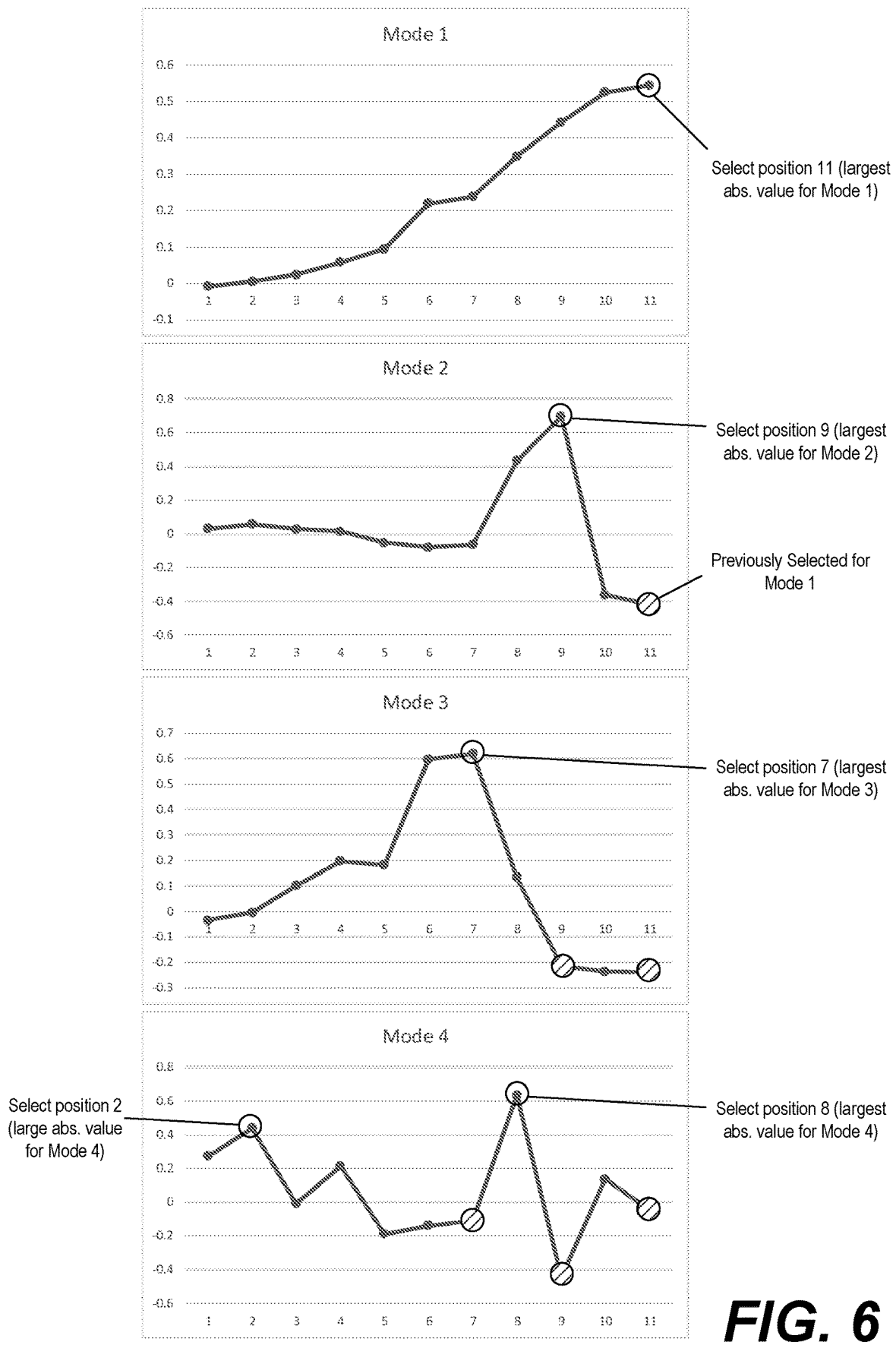
FIG. 6 depicts an example of four modes determined by an eigen-decomposition of a damage rate covariance matrix associated with damage rates obtained from tests or simulations.

Accordingly, at operation 308 an off-board system 110 can identify a subset of the first modes. As noted above, in some embodiments the first few modes in matrix C ordered based on an arrangement of higher to lower associated eigenvalues $\lambda$ can be used when evaluating a machine 102, and a subset including a number of the first modes can be identified at operation 308. In some examples, an off-board system 110 can be configured to identify a preset number of the first modes to use as the subset. In other example, an off-board system 110 can be configured to include modes in the subset that are associated with eigenvalues $\lambda$ above a preset value or threshold. FIG. 6 depicts an example in which the identified subset includes the first four modes of an example of matrix C, and plots of the component values at each of eleven candidate positions on a machine 102 are shown with respect to the first four modes. In FIG. 6, the component values of the four modes at each position can be normalized to values between −1 and 1. In other examples, another subset of modes may be used, such as a subset of one mode, two modes, three modes, five modes, six modes, or any other number of modes.

At operation 310, an off-board system 110 can identify a set of positions on the machine 102 as being associated with components of each mode in the subset that have the largest responses. The largest responses can be positive or negative, and accordingly can be considered to be the largest absolute values of the components of the modes. In some examples, the off-board system 110 can select positions corresponding to components having global maximums or minimums, and/or local maximums or minimums, in the mode shapes. As an example, in FIG. 6, an off-board system 110 can first evaluate the first mode, and select position eleven because it is the component with the highest absolute value for the first mode. The off-board system 110 can next evaluate the second mode, and select position nine because it has the highest absolute value of the remaining positions. The off-board system 110 can next evaluate the third mode, and select position seven because it has the highest absolute value of the remaining positions. The off-board system 110 can next evaluate the fourth mode, and select position eight because it has the highest absolute value of the remaining positions. In some examples, the off-board system 110 can also determine that although the shape of the fourth mode has a global maximum at the component associated with position eight, the shape of the fourth mode also has local maximum at the component associated with position two, indicating that position two is also a significant component of the fourth mode. The off-board system 110 can therefore also select position two in some examples. Accordingly, overall positions two, seven, eight, nine, and eleven on a machine 102 can be selected in the example of FIG. 6 because they represent positions on the machine 102 that have the highest absolute values across the first four modes, which are the modes that can be expected to govern the shortest lives.

At operation 312, an off-board system 110 can verify that data associated with the selected positions can accurately reproduce a set of target observed data. To verify that the selected positions can be used to accurately reproduce target observed data, the off-board system 110 can use data associated with the selected positions to calculate estimated modal coordinates $\hat{z}$. For example, because four modes were used in the subset in the example shown in FIG. 6 and five positions on the machine 102 were selected, the off-board system 110 can truncate, from the original matrix C, a reduced matrix $C_{red}$ with four columns corresponding to the four modes in the subset and five rows with damage rate data corresponding to the five selected positions. Next, the off-board system 110 can use a least-squares pseudo-inverse operation to generate a column vector of estimated modal coordinates $\hat{z}$ according to the following equation:

$$\{\hat{z}\} = [C_{red}^T C_{red}]^{-1} C_{red}^T \{DR_{obs}\}.$$

Here, $\{DR_{obs}\}$ can be damage rates that were observed at the selected positions during testing. In some examples, the off-board system 110 can verify that target observed damage rates $\{DR_{obs}\}$ are within the multivariate distribution of test or simulation data from which the eigenvectors are extracted in order to ensure that the target observed damage rates $\{DR_{obs}\}$ can be accurately reproduced using the eigenvectors of matrix C.

In some examples, the off-board system 110 can calculate estimated modal coordinates $\hat{z}$ such that the eigenvectors in matrix C are fit to all target observed damage rates $\{DR_{obs}\}$, such as damage rates observed in data about a sample of machines 102 operated by customers when strain measurement devices 104 were placed on the machines 102. For instance, when the five positions circled in FIG. 6 are selected based on simulation data, $\{DR_{obs}\}$ can be damage rates measured by strain measurement devices 104 at those same five positions during tests of a sample of customer machines 102.

In other examples, an off-board system 110 can calculate estimated modal coordinates $\hat{z}$ such that the eigenvectors in matrix C are fit to a target severity level in observed data. In some example, the target severity level can be observed $90^{th}$ percentile customer damage rates, or any other desired percentile of customer damage rates. For instance, strain measurement devices 104 can be placed on a random sample of customer machines 102, and corresponding average damage rates can be obtained. For each individual candidate position measured across the set of customer machines, an off-board system 110 can identify the 90$^{th}$ percentile (or other target percentile) damage rate and be combine them into a set of damage rates corresponding to observed 90th percentile (or other target percentile) customer damage rates. In these examples, an off-board system 110 can find eigenvectors of matrix C using damage rate data measured by strain measurement devices 104 during physical tests or during simulations, and find model coefficients $\{\hat{z}\}$ according the equation above that fit those eigenvectors to a target severity level in observed data, such as observed 90$^{th}$ percentile customer damage rates.

An off-board system 110 can create an augmented matrix $C_{aug}$ that includes all of the rows from the original matrix C, but is still column-truncated. For example, if reduced matrix $C_{red}$ has four columns and five rows, the augmented matrix $C_{aug}$ can have four columns corresponding to the four modes in the subset but have rows for all eleven candidate positions on the machine 102. The off-board system 110 can recreate column vector of observed damage rates $\{DR_{obs}\}$ from tests at all eleven positions at or above a threshold similarity measure if enough positions were selected by multiplying the augmented matrix $C_{aug}$ by the column vector of estimated modal coordinates $\hat{z}$, as shown below:

$$\{DR_{obs}\} = C_{aug}\{\hat{z}\}.$$

In some examples, if multiplying the augmented matrix $C_{aug}$ by the estimated modal coordinates $\hat{z}$ does not reproduce the column vector of observed damage rates at or above the threshold similarity measure, the off-board system 110 can go back to operations 308 and/or 310 and select one or more additional positions and/or modes, generate a new reduced matrix $C_{red}$ with a number of columns corresponding to the number of selected modes and a number of rows corresponding to the number of selected positions, estimate a new column vector of estimated modal coordinates $\hat{z}$, and again check at operation 312 whether the estimated modal coordinates $\hat{z}$ accurately reproduce the column vector of observed damage rates at or above the threshold similarity measure.

In some examples, as an alternative to operations 308-312, at operation 314 the off-board system 110 can identify a set of positions on the machine 102 using a D-optimal row selection operation. As discussed above with respect to operation 312, a row-reduced $C_{red}^T C_{red}$ can be used in a least-squares pseudo-inverse operation for determining estimated modal coordinates $\hat{z}$, as expressed in the below equation:

$$\{\hat{z}\} = [C_{red}^T C_{red}]^{-1} C_{red}^T \{DR_{obs}\}.$$

At operation 314, the off-board system 110 can use a D-optimal row selection algorithm to identify a set of positions on the machine 102 that maximizes the determinant of the row-reduced $C_{red}^T C_{red}$.

In some examples, because the eigenvectors in matrix C are orthogonal in the modal approach described herein, operations 308-312 described above may sufficiently approximate a D-optimal row selection by selecting positions on the machine 102 based on where eigenvectors in matrix C have the highest maximum values, especially when the number of candidate positions and/or number of modes are relatively low, such as when those numbers are under predefined threshold values. However, in other examples, the off-board system 110 can at operation 314 directly use a D-optimal row selection algorithm to find a set of positions on the machine 102 that maximizes the determinant of the row-reduced $C_{red}^T C_{red}$.

At operation 316, an off-board system 110 can use or identify the positions selected on the machine 102 through either operations 308-312 or operation 314 as damage rate monitoring positions on a machine 102 that are to be monitored during subsequent tests and/or simulations. For example, damage rates associated with the selected positions can be obtained during new simulations, or strain measuring devices 104 can be placed at the selected positions on the machine 102 to obtain corresponding damage rates during new physical tests. As discussed above, the number of selected positions can be less than the number of candidate selections, but damage rates for the selected positions could be used to accurately reproduce damage rates at other non-selected positions. Accordingly, by monitoring the selected damage rate monitoring positions during subsequent tests and/or simulations, new damage rates associated with the selected damage rate monitoring positions can be used to accurately determine damage rates at substantially any position on the machine 102, including other, non-monitored, positions. For example, new damage rates from strain measurement devices 104 located at selected damage rate monitoring positions can be used by an off-board system 110 to infer global modal coordinates $\hat{z}$ that represent damage rates in the modal space for a truncated subset of modes via a least-squares pseudo-inverse operation using:

$$\{\hat{z}\} = [C^T C]^{-1} C^T \{DR_{obs}\}.$$

As an example, although in the example of FIG. 6 only damage rate monitoring positions are selected out of eleven candidate positions on a machine 102, an off-board system 110 can use damage rates associated with those five damage rate monitoring positions to accurately reproduce damage rates at all eleven candidate positions. As such, monitoring damage rates at only the five damage rate monitoring positions can provide sufficient data to determine damage rates at any non-monitored position. More generally, even though tens, hundreds, or even thousands of positions on a machine 102 may be candidates for damage rate monitoring positions, an off-board system 110 can use the method of FIG. 3 to identify a smaller subset of damage rate monitoring positions where modes in matrix C have the largest responses. An off-board system 110 can thus use damage rates associated with the selected damage rate monitoring positions obtained during subsequent tests or simulations to accurately determine damage rates at positions on the machine 102 that were not selected as damage rate monitoring positions.

Additionally, when the eigenvectors of matrix C are fit to a target severity level in observed data, such as observed 90$^{th}$ percentile customer damage rates, using estimated model coefficients $\{\hat{z}\}$, an off-board system 110 can select damage rate monitoring positions as described above such that damage rates associated with the set of damage rate monitoring positions can be used by an off-board system 110 to accurately determine the target percentile of damage rates at other non-monitored positions.

As described above, the eigenvectors in matrix C, the eigenvalues in matrix $D_z$, the corresponding modal coordinates z, and/or estimated modal coordinates $\hat{z}$ derived from test or simulation data can be used by an off-board system 110 to select damage rate monitoring positions for subsequent tests or simulations of the same design of the machine 102. However, the damage rate monitoring positions can also be selected such that damage rates obtained from subsequent tests or simulations of the same design of the machine 102 can be used to make predictions about new designs for the machine 102.

Figure 7:
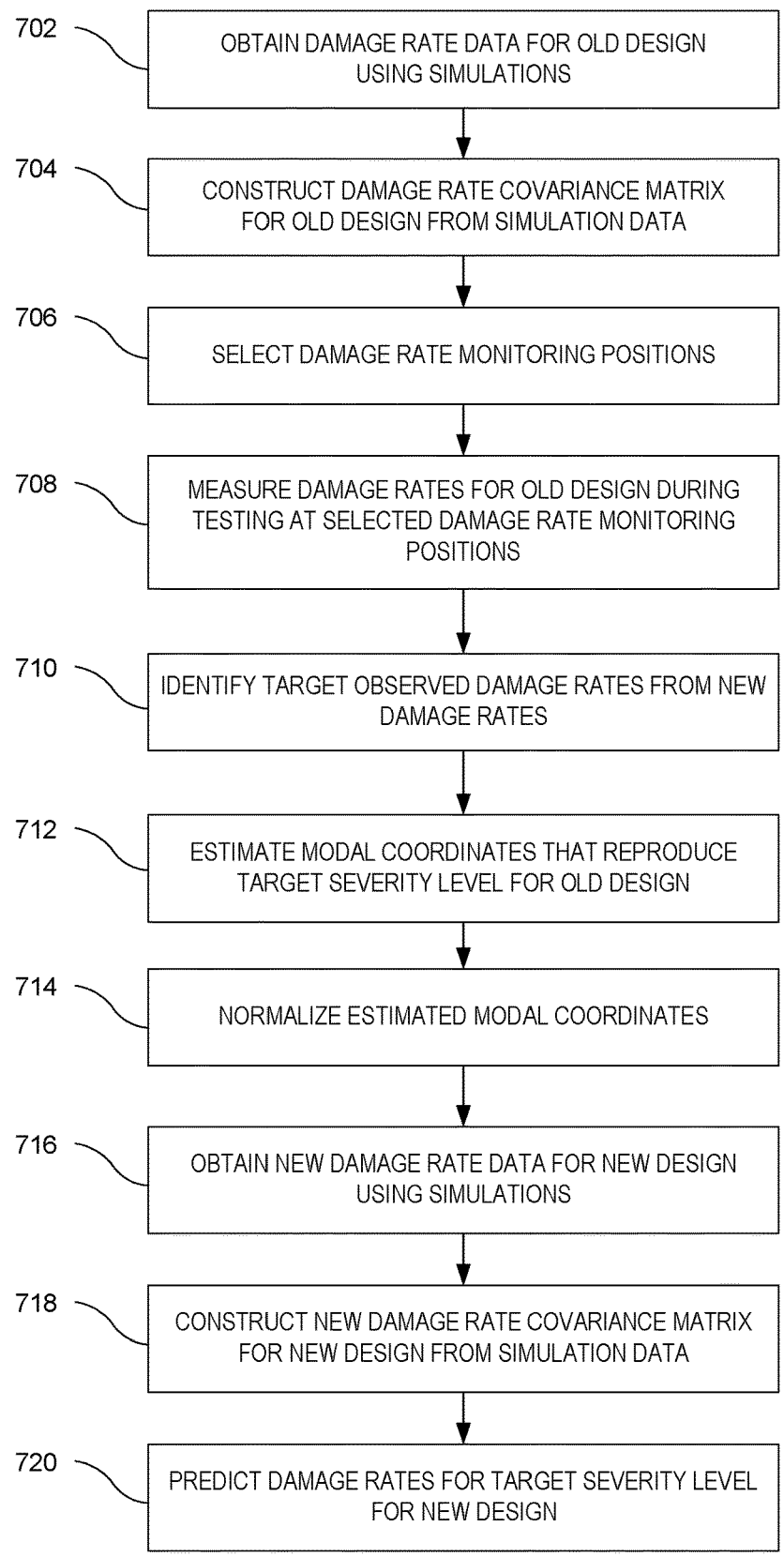
FIG. 7 is a flowchart illustrating a method for predicting damage rates for a target severity level in a new design for a machine.

FIG. 7 is a flowchart illustrating a method 700 for predicting damage rates for a target severity level in a new design for a machine 102. As described herein, modal analysis of an old design for a machine 102 can be used to determine damage rate monitoring positions for the old design, and can also be used to predict damage rates for a new design of the machine 102 that match observed target severity levels from the old design. Method 700 is described for illustration purposes only with respect to the worksite environment and machine components and processes depicted in FIGS. 1-2. However, it should be apparent that method 700 may be employed with other systems and interfaces. Further, the order of operations of FIG. 7 should not be considered limiting. The method of FIG. 7 can be performed by one or more off-board systems 110 or other computing devices. In some examples, computer-readable instructions can be executed by one or more processors of the off-board systems 110 or other computing devices to implement the operations of method 700.

At operation 702, an off-board system 110 can obtain damage rate data for an old design of a machine 102 by running computer simulations that subject the old design of the machine 102 to simulated fatigue-damaging events. The simulation ensemble can be designed to simulate multiple CWC events and result in damage rates with high variabilities. An off-board system 110 can compare results of each simulation against corresponding observed test data to verify that the resulting damage rates are within an expected multivariate distribution. From the admissible simulations, an off-board system 110 can calculate an average damage rate column vector DR for each position of finite life.

At operation 704, an off-board system 110 can construct a damage rate covariance matrix from the simulation data using $COV(DR)=[\rho_{ij}S_iS_j]=CD_zC^T$, and can perform an eigen-decomposition on the damage rate covariance matrix as described above with respect to FIG. 3 to obtain eigenvectors in a matrix C that express damage rate modes and eigenvalues in a diagonal matrix $D_z$ that express variances of corresponding modal coordinates z. Here, information from all of the admissible simulations for the old design of the machine 102 can be retained in the damage rate covariance matrix and its eigenvectors and eigenvalues, but be reorganized according to modes ordered according to the largest associated eigenvalues. An off-board system 110 can also find average modal coordinates $\bar{z}_{old}$ for the old design of the machine 102 using:

$$\bar{z}_{old}=C^T\overline{DR}.$$

At operation 706, an off-board system 110 can select damage rate monitoring positions for the old design of the machine 102. As discussed above with respect to FIG. 3, an off-board system 110 can select damage rate monitoring positions by identifying positions on the old design of the machine 102 that are associated with components of a subset of the first few modes that have the largest responses as described above with respect to operations 308-312, or based on a direct D-optimal row selection operation as described above with respect to operation 314.

At operation 708, an off-board system 110 can obtain new damage rates based on measurements from strain measurement devices 104 placed at the selected damage rate monitoring positions on a set of machines 102 of the old design during new physical tests. In some examples, the new physical tests can be performed by placing strain measurement devices 104 at the selected damage rate monitoring positions on a statistically-significant sample of randomly chosen customer machines 102 that are all of the old design. In some examples, an off-board system 110 can determine average damage rates for each position from the set of damage rates measured for each machine 102.

At operation 710, an off-board system 110 can identify target observed damage rates from the new test data. For example, the target observed damage rates can be a $90^{th}$ percentile of observed customer damage rates. In this example, an off-board system 110 can identify a $90^{th}$ percentile of observed damage rates for each damage rate monitoring position from the test data, even if the 90th percentile of observed damage rates at different damage rate monitoring positions correspond to different physical machines 102 that were tested. In other examples, an off-board system 110 can use any other percentile of observed customer damage rates as the target observed damage rates.

At operation 712, an off-board system 110 can find estimated modal coordinates $\hat{z}$ that can reproduce the target observed damage rates $DR_{obs}$, such as $90^{th}$ percentile observed damage rates, from matrix C. Here, the off-board system 110 can truncate matrix C to have columns corresponding to the selected modes and rows corresponding to the selected damage rate monitoring positions for the old design of the machine 102. The an off-board system 110 can find the estimated modal coordinates $\hat{z}$ using the following formula:

$$\hat{z}=[C^TC]^{-1}C^T\{DR_{obs}\}.$$

At operation 714, an off-board system 110 can normalize the estimated modal coordinates $\hat{z}$ into normalized modal coordinates $z_{i\_norm}$ by subtracting the average modal coordinates $\bar{z}_{old}$ for the old design of the machine 102 from the estimated modal coordinates $\hat{z}_i$ and then dividing by the square root of corresponding eigenvalues $\lambda_{old\_i}$ that were found for the old design of the machine 102, as shown below:

$$z_{i\_norm} = \frac{\hat{z}_i - z_{old\_i}}{\sqrt{\lambda_{old\_i}}}.$$

Figure 8:
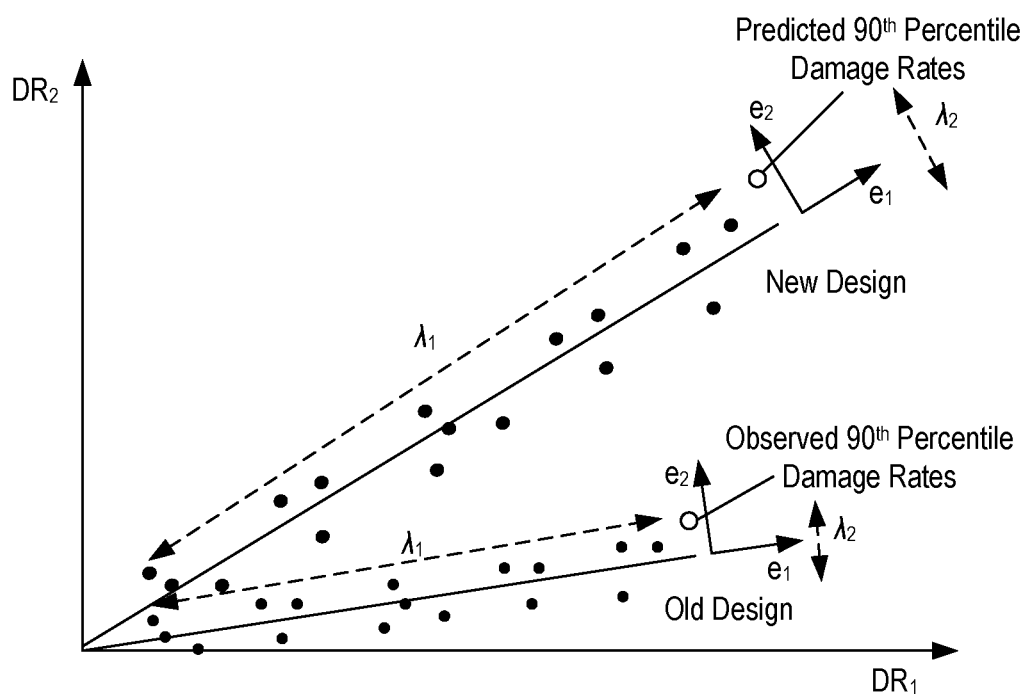
FIG. 8 depicts a two-dimensional plot of damage rates corresponding to two positions on a machine.

Accordingly, after operation 714, an off-board system 110 can have found the relative position of the column vector for the target observed damage rates from the test data within a multivariate distribution of damage rates from the simulation. For example, the estimated modal coordinates $\hat{z}$ can provide coordinates for the absolute location of the column vector for the target observed damage rates along eigenaxes. The normalized modal coordinates $z_{i\_norm}$ can indicate the location information in terms of a number of standard deviations that the target observed damage rates are away from the mean. As an example, FIG. 8 depicts a two-dimensional plot of damage rates corresponding to two positions on a machine 102, similar to FIG. 5. As shown in FIG. 8, a relative position of $90^{th}$ percentile observed damage rates from tests of an old design of a machine 102 can be found in the distribution of the damage rates for the old design.

At operation 716, an off-board system 110 can obtain new damage rate data for a new design of the machine 102 by running computer simulations that subject the old design of the machine 102 to simulated fatigue-damaging events. These simulations can be identical to the simulations performed at operation 702, except that the design of the machine 102 has been perturbed in one or more ways. For example, if the machine 102 is a hydraulic excavator, the new design for the machine 102 may have differences relative to the old design, such as a differently shaped boom or stick, an upgraded engine, and/or changes to the hydraulic system. However, the same simulation ensemble, with the same initial conditions and model parameters, run on the old design can be run again with the new design to obtain new damage rate data at operation 716. An off-board system 110 can again compare results of each simulation against corresponding observed test data to verify that the resulting damage rates are within an expected multivariate distribution. From the admissible simulations, an off-board system 110 can calculate a new average damage rate column vector rate $\overline{DR}_{new}$ for each position of finite life.

At operation 718, an off-board system 110 can construct a new damage rate covariance matrix from the new damage rate data from the simulations for the new design, and perform a new eigen-decomposition on the new damage rate covariance matrix as described above with respect to FIG. 3 to obtain a new matrix $C_{new}$ and a new diagonal matrix of eigenvalues $D_{z\_new}$, as shown below:

$$COV(DR)=[\rho_{ij}S_iS_j]=C_{new}D_{z\_new}C_{new}^T.$$

The off-board system 110 can also find average modal coordinates $\overline{z}_{new}$ for the new design of the machine 102 using:

$$\overline{z}_{new}=C_{new}^T\overline{DR}_{new}.$$

At operation 720, an off-board system 110 can use data about the old and new designs to make a prediction about the target severity level, such as a 90$^{th}$ percentile of damage rates, for the new design of the machine 102. In particular, the off-board system 110 can find adjusted estimated modal coordinates $\hat{z}_{adj\_i}$ for the target severity level by multiplying normalized modal coordinates $z_{i\_norm}$ associated with the target severity level for the old design of the machine 102 by the square root of eigenvalues $\lambda_{new\_i}$ calculated for the new design of the machine, and then adding the new average modal coordinates $\overline{z}_{new}$, as shown below:

$$\hat{z}_{adj\_i}=\overline{z}_{new\_i}+z_{i\_norm}\sqrt{\lambda_{new\_i}}.$$

The off-board system 110 can multiply the adjusted estimated modal coordinates $\hat{z}_{adj\_i}$ by the new matrix $C_{new}$ of eigenvectors obtained during operation 716 to obtain a column vector of predicted damage rates $DR_{pred}$ associated with the target severity level, as shown below:

$$\{DR_{pred}\}=C_{new}\hat{z}_{adj}.$$

For example, if the target severity level is a 90$^{th}$ percentile of damage rates, an off-board system 110 can use the normalized modal coordinates $z_{i\_norm}$ for 90$^{th}$ percentile observed damage rates for the old design to determine adjusted estimated modal coordinates $\hat{z}_{adj\_i}$ for 90$^{th}$ percentile observed damage rates for the new design. The off-board system 110 can then use the adjusted estimated modal coordinates $\hat{z}_{adj\_i}$ for 90$^{th}$ percentile observed damage rates for the new design with a new matrix $C_{new}$ obtained from new simulations for the new design to predict 90$^{th}$ percentile damage rates for the new design.

As shown in the example of FIG. 8, a prediction can be made about the target severity level for the new design because the target severity level can be expected to be at the same relative location within a distribution of damage rates from simulations for the new design as it was in damage rates observed during tests of the old design. Accordingly, although a new design for a machine 102 may have changed one or more aspects of the machine 102 relative to the old design and average damage rates may be different for the new design, as shown in FIG. 8 eigenvectors for the new design can be similar to, but be rotated from, eigenvectors for the old design. Corresponding eigenvalues may also change. However, overall the multivariate distribution of damage rates from the old design can translate and rotate with the new eigenvectors for the new design, and can expand or contract according to the new eigenvalues for the new design.

As an example, the 90$^{th}$ percentile customer damage rate for the new design can be at the same relative position in the multivariate distribution for the new design as it was for the old design. As such, the position of an observed 90$^{th}$ percentile customer damage rate for an old design can be rotated and/or scaled based on differences between the eigenvectors and/or eigenvalues associated with the different designs to find the position of a predicted 90$^{th}$ percentile customer damage rate for the new design. In other words, if observed 90$^{th}$ percentile damage rates for the old design was one standard deviation away from the mean, then 90$^{th}$ percentile damage rates for the new design can be predicted as being one standard deviation away from the mean as calculated using new eigenvalues for the new design.

INDUSTRIAL APPLICABILITY

The modal approach described herein can be used to select damage rate monitoring positions on the structure of a machine 102 that can be monitored during subsequent tests or simulations of the machine 102 to obtain damage rates associated with the damage rate monitoring positions. The damage rate monitoring positions can be selected based on a modal analysis such that damage rates associated with the selected damage rate monitoring positions can be used to accurately reproduce observed test data even at non-monitored positions. In some examples, the damage rate monitoring positions can be selected such that corresponding damage rates accurately reproduce a target severity level in observed test data, such as 90$^{th}$ percentile observed customer damage rates. By determining a number of damage rate monitoring positions that is small relative to the number of possible candidate monitoring positions, but can still be used to infer damage rates at non-monitored positions, fewer strain measurement devices 104 may be needed during subsequent tests. Similarly, subsequent simulations may not need to directly calculate simulated damage rates at all candidate positions, but only calculate simulated damage rates at the damage rate monitoring positions and then infer damage rates at other positions on a machine.

Other methods for determining damage rate monitoring positions on the structure of a machine 102 have been developed, including an event-based method that attempts to span the damage rate space with events using a basis matrix of damage rates at multiple locations from tests or simulations, where each column of the basis matrix is an event. In the event-based method, coefficients in a column vector that are each associated with one of the events in the basis matrix can be found that map the basis matrix to a vector of target severity levels in observed data. The event-based method can use D-optimal row selection to find rows in the basis matrix that maximize a determinant of the basis matrix multiplied by the transpose of the basis matrix, and positions on the machine 102 corresponding to those rows can be used as damage rate monitoring positions in subsequent tests or simulations, as those positions may provide information that can best estimate the unknown coefficients in the column vector.

The event-based method attempts to span the damage rate space with events, and information remains in the original damage rate space. However, if the events used in the event-based method did not fully span the damage rate space, there may be no guarantee that the estimated coefficients in the column vector based on positions identified on a machine will be able to fully reproduce the observed data from the basis matrix. Additionally, the set of events used to obtain the damage rates may not have been orthogonal or linearly independent, and accordingly the calculation of the coefficients may not be well-conditioned, unless events that are near-linear combinations of other events are discarded during the analysis. However, although such discarded events may be near-linear combinations of other events, they may not be exact combinations. Therefore, unique and valuable information may be discarded and not considered during the event-based method.

In the modal analysis described herein, rotation of data from the damage rate space into a modal space where the modes are orthogonal allows all data to be retained in matrix C and not be discarded, even if only a truncated version of matrix C is used for a subset of modes and positions. That truncated matrix C can therefore more accurately reproduce observed data in the modal approach than may be possible in the event-based approach, and accordingly can better determine damage rate monitoring positions that can be used to infer damage rates at non-monitored positions. Additionally, while in some examples D-optimal row selection algorithms can be used in the modal approach to identify damage rate monitoring positions, in other examples, because the modes are orthogonal in the modal approach, D-optimal row selection may be approximated by selecting damage rate monitoring positions based on the strongest responses for a subset of the first few modes.

The modal approach described herein can be also be used to select damage rate monitoring positions on the structure of an old design for a machine 102 based on simulations, such that damage rate data can be measured at the selected damage rate monitoring positions during subsequent tests of the old design. Simulations can then be performed to obtain damage rate data for a new design of the machine 102, and the modal analysis can be used to predict damage rates at a target severity level for the new design based on the relative position of the target severity level in a distribution for the old design. As noted above, earlier event-based approaches may need to discard events that are near-linear combinations of other events, and the loss of unique data associated with such discarded events may skew results if the analysis were to be applied to a prediction for a new design for the machine 102. The modal analysis described herein can thus provide more accurate predictions of damage rates for target severity levels with respect to new designs for a machine 102.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computer-implemented method, comprising:
    obtaining, by one or more processors, damage rate data associated with a plurality of positions on a machine;
    constructing, by the one or more processors, a damage rate covariance matrix based on the damage rate data;
    deriving, by the one or more processors, a matrix of modes from the damage rate covariance matrix; and
    selecting, by the one or more processors, damage rate monitoring positions on the machine by identifying a subset of the plurality of positions on the machine that maximize a determinant associated with the matrix of modes using D-optimal row selection.

2. The computer-implemented method of claim 1, wherein the D-optimal row selection is approximated by identifying, by the one or more processors, the subset of the plurality of positions on the machine that are associated with components having largest absolute values across a subset of modes.

3. The computer-implemented method of claim 1, wherein deriving the matrix of modes comprises:
    extracting, by the one or more processors, eigenvectors representing modes of the damage rate covariance matrix; and
    extracting, by the one or more processors, eigenvalues that express variances of modal coordinates corresponding to the modes,
    wherein a linear superposition of the eigenvectors and the modal coordinates determines corresponding damage rates.

4. The computer-implemented method of claim 1, further comprising:
    obtaining, by the one or more processors, new damage rate data from strain measurement devices placed on the machine at the damage rate positions during tests subjecting the machine to fatigue-damaging events.

5. The computer-implemented method of claim 4, further comprising estimating, by the one or more processors, and based on the new damage rate data associated with the damage rate monitoring positions, damage rates at one or more non-monitored positions on the machine.

6. The computer-implemented method of claim 4, further comprising:
    selecting, by the one or more processors, target observed damage rates from the new damage rate data;
    estimating, by the one or more processors, modal coordinates that, when multiplied by the matrix of modes, reproduce the target observed damage rates;
    obtaining, by the one or more processors, simulated damage rate data associated with the plurality of positions on a new design for the machine;
    constructing, by the one or more processors, a new damage rate covariance matrix based on the simulated damage rate data;
    translating, by the one or more processors, the modal coordinates associated with the target observed damage rates for the machine into a new distribution associated with the new damage rate covariance matrix for the new design of the machine; and
    predicting, by the one or more processors, damage rates for the new design of the machine that correspond to the target observed damage rates based on a relative position of the modal coordinates in the new distribution.

7. The computer-implemented method of claim 1, further comprising verifying, by the one or more processors, that multiplying the matrix of modes by modal coordinates associated with the damage rate monitoring positions substantially reproduces target data observed in tests.

8. The computer-implemented method of claim 7, wherein the target data comprises damage rates at a particular severity level.

9. A computing system, comprising
    one or more processors; and memory storing computer-executable instructions that, when executed by the one or more processors, cause the one or more processors to perform operations comprising:

obtaining damage rate data associated with a plurality of positions on a machine;

constructing a damage rate covariance matrix based on the damage rate data;

deriving a matrix of modes from the damage rate covariance matrix; and selecting damage rate monitoring positions on the machine by identifying a subset of the plurality of positions on the machine that maximize a determinant associated with the matrix of modes using D-optimal row selection.

10. The computing system of claim 9, wherein the operations approximate the D-optimal row selection by identifying the subset of the plurality of positions on the machine that are associated with components having largest absolute values across a subset of modes.

11. The computing system of claim 9, wherein deriving the matrix of modes comprises:

extracting eigenvectors representing modes of the damage rate covariance matrix; and extracting eigenvalues that express variances of modal coordinates corresponding to the modes, wherein a linear superposition of the eigenvectors and the modal coordinates determines corresponding damage rates.

12. The computing system of claim 11, wherein the operations further comprise:

obtaining new damage rate data from strain measurement devices placed on the machine at the damage rate monitoring positions during tests subjecting the machine to fatigue-damaging events.

13. The computing system of claim 12, wherein the operations further comprise:

estimating, from the new damage rate data associated with the damage rate monitoring positions, damage rates at one or more non-monitored positions on the machine.

14. The computing system of claim 12, wherein the operations further comprise:

selecting target observed damage rates from the new damage rate data;

estimating modal coordinates that, when multiplied by the matrix of modes, reproduce the target observed damage rates;

obtaining simulated damage rate data associated with the plurality of positions on a new design for the machine;

constructing a new damage rate covariance matrix based on the simulated damage rate data;

translating the modal coordinates associated with the target observed damage rates for the machine into a new distribution associated with the new damage rate covariance matrix for the new design of the machine; and predicting damage rates for the new design of the machine that correspond to the target observed damage rates based on a relative position of the modal coordinate in the new distribution.

15. A computer-implemented method of predicting damage rates for a new machine design, comprising:

obtaining, by one or more processors, damage rate data associated with an old machine design based on a first simulation;

constructing, by the one or more processors, a damage rate covariance matrix based on the damage rate data;

deriving, by the one or more processors, a matrix of modes from the damage rate covariance matrix;

selecting, by the one or more processors, damage rate monitoring positions on the old machine design based on maximizing a determinant associated with the matrix of modes using D-optimal row selection;

obtaining, by the one or more processors, damage rates measured at the damage rate monitoring positions on a sample of machines corresponding to the old machine design;

selecting, by the one or more processors, target observed damage rates from the damage rates;

estimating, by the one or more processors, modal coordinates that reproduce the target observed damage rates from the damage rates;

obtaining, by the one or more processors, new damage rate data associated with a new machine design based on a second simulation;

constructing, by the one or more processors, a new damage rate covariance matrix based on the new damage rate data;

translating, by the one or more processors, the modal coordinates associated with the target observed damage rates for the old machine design into a new distribution associated with the new damage rate covariance matrix for the new machine design; and predicting, by the one or more processors, damage rates for the new machine design that correspond to the target observed damage rates based on a relative position of the modal coordinates in the new distribution.

16. The computer-implemented method of claim 15, wherein predicting the damage rates for the new machine design comprises:

determining, by the one or more processors, normalized modal coordinates associated with the old machine design based on the modal coordinates;

determining, by the one or more processors, average damage rates from the new damage rate data;

extracting, by the one or more processors, eigenvectors and eigenvalues from the new damage rate covariance matrix;

determining, by the one or more processors, average modal coordinates based on a product of the average damage rates and a transpose matrix of the eigenvectors;

determining, by the one or more processors, adjusted modal coordinates by adding a product of the normalized modal coordinates and a square root of the eigenvalues to the average modal coordinates; and determining, by the one or more processors, predicted damage rates based on a product of a matrix of the eigenvectors and the adjusted modal coordinates.

17. The computer-implemented method of claim 16, wherein the first simulation and the second simulation are substantially identical apart from differences between the old machine design and the new machine design.

18. The computer-implemented method of claim 16, wherein the target observed damage rates are identified, by the one or more processors, by determining, at multiple positions, a target severity percentile within the damage rates measured on the sample of machines.

19. The computer-implemented method of claim 16, wherein the modal coordinates represent a first position of the target observed damage rates in a distribution of the damage rate data associated with the old machine design based on the first simulation.

20. The computer-implemented method of claim 19, wherein predicting damage rates for the new machine design comprises finding, by the one or more processors, the relative position as a second position for the target observed damage rates within the new distribution associated with the new machine design.

* * * * *